No. 867,278. PATENTED OCT. 1, 1907.
L. A. KEENE & M. R. PHARIS.
FERTILIZER DISTRIBUTER.
APPLICATION FILED JAN. 5, 1907.

Witnesses:
C. Paul Parker
Geop L Chindahl

Inventors
Louis A. Keene
Mott R. Pharis
By Luther L. Miller
Atty.

UNITED STATES PATENT OFFICE.

LOUIS A. KEENE, OF WATERMAN, AND MOTT R. PHARIS, OF MOLINE, ILLINOIS.

FERTILIZER-DISTRIBUTER.

No. 867,278.

Specification of Letters Patent.

Patented Oct. 1, 1907.

Application filed January 5, 1907. Serial No. 350,880.

*To all whom it may concern:*

Be it known that we, LOUIS A. KEENE and MOTT R. PHARIS, citizens of the United States, residing at Waterman, Illinois, and Moline, Illinois, respectively, have invented certain new and useful Improvements in Fertilizer-Distributers, of which the following is a specification.

This invention relates to fertilizer distributers, and refers particularly to machines for spreading manure which comprise a rapidly revolving beater cylinder for discharging the manure and scattering it upon the ground.

The object of this invention is the production of means for cutting up long straws, plant stalks, or lumps of manure or other fertilizer, previous to its being discharged from the machine by the beater cylinder.

Figure 1:
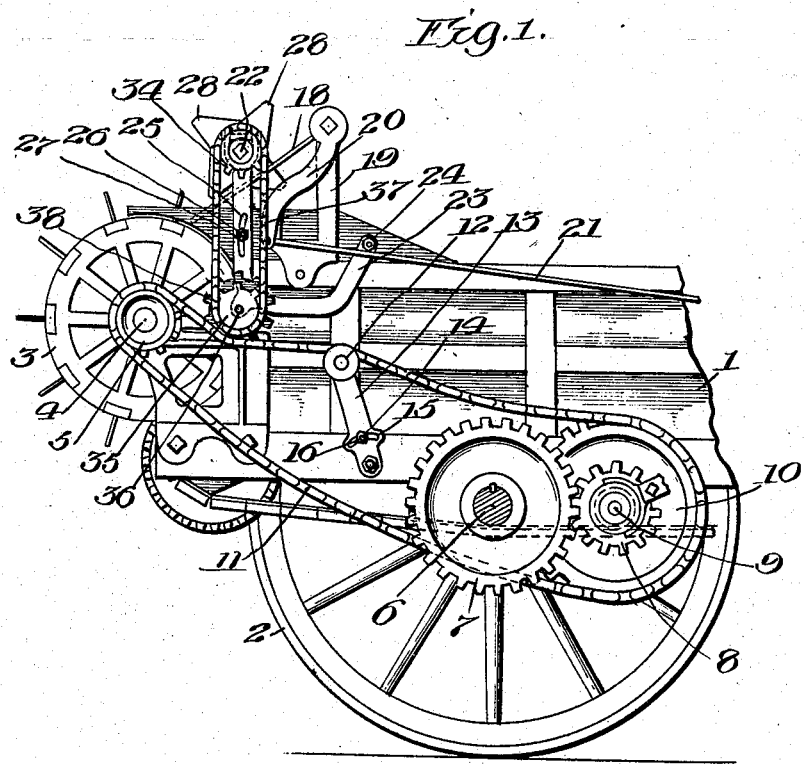
Figure 2:
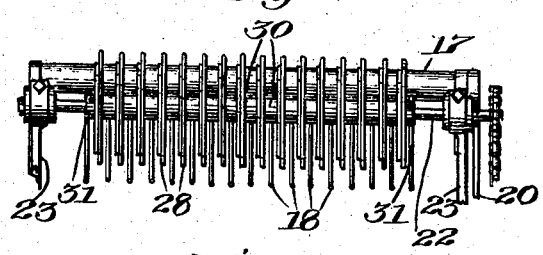
Figure 3:
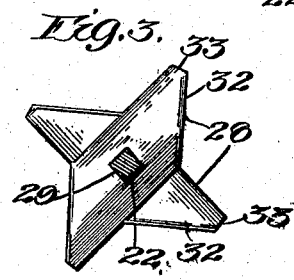

In the accompanying drawings Figure 1 is a side elevation of the rear portion of a manure spreader embodying the features of our invention. Fig. 2 is a rear side elevation of that part of the manure-spreader mechanisms to which the present invention relates. Fig. 3 is a detail view of a pair of knives comprised in this embodiment of the invention.

We have chosen to illustrate our present improvements as applied to a manure spreader of the construction shown in Patents Nos. 773,505 and 819,659, although it is to be understood that said improvements are equally susceptible of use in connection with manure spreaders of other constructions. No limitation, therefore, is intended by the reference to our patents above noted.

The box 1 of the manure spreader herein illustrated comprises a movable bottom (not illustrated in detail) arranged to be moved rearwardly to discharge the load, and to be returned to normal position by mechanism driven from the rear wheels 2. At the rear end of the box 1 is rotatably supported the beater cylinder 3, the shaft 4 of which is provided at one end with a sprocket wheel 5. Upon the driving axle 6 is fixed a spur gear wheel 7 meshing with a pinion 8 mounted upon a shaft 9 suitably supported beneath the box 1. A sprocket wheel 10 is fixed with relation to the pinion 8, and carries a drive chain 11 which also extends over the sprocket wheel 5. A tightener sheave 12 is rotatably supported upon an arm 13 pivotally mounted on one side of the box 1 in position to carry the upper side of the drive chain 11 at a point between the sprockets 5 and 10. By reason of the pivotal mounting of the arm 13, the tightener sheave 12 may be moved as required to take up slack in the chain 11, said arm being fixed in adjusted position, in this instance, by means of a screw bolt 14 extending through an elongated opening 15, said bolt being provided with a nut 16.

A rake 17 comprising teeth or tines 18 is pivotally mounted in proper relation to the beater cylinder 3 in bearing brackets 19 carried by the box 1. An arm 20 fixed with relation to said rake provides means for swinging said rake toward and away from the beater cylinder. The outer end of the arm 20 is pivotally connected with the rear end of a connecting rod 21 forming a part of the means for operating said rake. In Fig. 1 the rake is shown in its rear or operative position.

A shaft 22 is rotatably supported at a point above and rearwardly of the rake 17. In the present embodiment the means for thus supporting the shaft 22 comprises two brackets 23 each pivotally mounted upon a pivot pin or bolt 24 fixed in or upon the side of the box 1. At a point between the ends of each bracket is formed an arcuate slot 25, and through said slot extends suitable means for rigidly securing the bracket in adjusted position, such as a bolt 26 provided with a nut 27. The adjustable mounting of the brackets 23 permits of adjusting the position of the shaft 22 and the parts carried thereby with relation to the beater cylinder 3 and the rake 17. Upon the shaft 22 is supported a series of cutting elements, such, for example, as knives 28 arranged in any suitable way, as by grouping them in pairs and spacing the pairs of knives as shown in Fig. 2. Throughout the greater portion of its length the shaft 22 is square in cross-section. The knives 28 have square openings 29 therein to receive the shaft 22, said knives being secured in position upon said shaft in any suitable way, as, for instance, by placing distance sleeves 30 between adjacent pairs of knives, and securing the series of knives and distance sleeves together by means of collars 31 fixed to the shaft 22. The knives 28 are provided with cutting edges 32 and 33.

The means for rotating the series of cutting elements comprises a sprocket wheel 34 fixed upon one end of the cutter shaft 22 and a sprocket wheel 35 rotatably mounted upon a stub-shaft 36 carried by one of the brackets 23, a sprocket chain 37 extending over said sprocket wheels. A sprocket wheel 38 is fixed with relation to the sprocket wheel 35, and is engaged and rotated by the drive chain 11. Said drive chain is held in proper relation to the sprocket wheel 38 by means of the adjustable tightener sheave 12.

When the rake 17 is in operative position, the tines 18 thereof lie between the pairs of knives 28, as illustrated in Figs. 1 and 2. Said rake prevents the discharge of large masses of material from the box 1 by the beater cylinder 3. The knives 28 cut up all long or matted fibers or stalks, and assist the beater cylinder 3 in breaking up any large lumps or masses of manure that may be present. Preferably, though not necessarily, the cutter shaft 22 and beater shaft 4 rotate at the same speed. The cutter knives 28 being of less diameter than the beater cylinder 3, the peripheral speed of said knives is less than that of the beater cylinder, hence they tend in a measure to retard the discharge of manure by said beater cylinder.

While we have described in some detail a specific embodiment of our invention which we deem to be new and advantageous in the details of construction, we do not desire to be understood as limiting ourselves in respect to the broader features of our invention to the specific construction shown and described.

We claim as our invention:

1. A fertilizer distributer comprising a beater cylinder, a rake, and a cutting device located rearwardly of said rake.

2. A fertilizer distributer comprising a beater cylinder, a rake, and a rotary cutting device located rearwardly of said rake.

3. A fertilizer distributer comprising a beater cylinder, a rake, and a series of cutting elements extending through said rake.

4. A fertilizer distributer comprising a beater cylinder, a rake, and a series of rotary cutting elements lying between the tines of said rake.

5. In a fertilizer distributer, in combination, distributing mechanism; and a plurality of pairs of knives, the members of each pair being arranged at right angles with each other, and said pairs being spaced apart.

6. In a fertilizer distributer, in combination, a beater cylinder; means for rotating said beater cylinder comprising a drive chain; a rotary cutting device; means for supporting said cutting device adapted to provide an adjustment of said device toward and away from said beater cylinder, said supporting means comprising a pivoted bracket and means for securing said bracket in adjusted position; and two drive members rotatably mounted on said bracket and operatively connected with each other for driving said cutting devices, one of said driving members being arranged to be driven by said driving chain.

LOUIS A. KEENE.
MOTT R. PHARIS.

Witnesses to the signature of Louis A. Keene:
J. E. DAVIS,
DAVID F. HIPPLE.

Witnesses to the signature of Mott R. Pharis:
JOHN HASSOR,
A. H. KNEBERG.